(12) United States Patent
Fuchikami (10) Patent No.: US 9,554,104 B2
(45) Date of Patent: Jan. 24, 2017

(54) PROJECTION SYSTEM AND SEMICONDUCTOR INTEGRATED CIRCUIT

(71) Applicant: Panasonic Intellectual Property Corporation of America, Torrance, CA (US)

(72) Inventor: Ryuji Fuchikami, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/958,905

(22) Filed: Dec. 3, 2015

(65) Prior Publication Data

US 2016/0088275 A1 Mar. 24, 2016

Related U.S. Application Data

(63) Continuation of application No. PCT/JP2015/000051, filed on Jan. 8, 2015.

(30) Foreign Application Priority Data

Feb. 18, 2014 (JP) .................................. 2014-028440
Nov. 20, 2014 (JP) .................................. 2014-235663

(51) Int. Cl.
*H04N 9/31* (2006.01)
*H04N 5/232* (2006.01)
(Continued)

(52) U.S. Cl.
CPC ............ *H04N 9/3179* (2013.01); *G03B 17/54* (2013.01); *G03B 21/14* (2013.01); *H04N 5/232* (2013.01);
(Continued)

(58) Field of Classification Search
CPC ......... G03B 21/14; G03B 17/54; H04N 5/225; H04N 5/232; H04N 5/74; H04N 19/44; H04N 9/3179; H04N 9/3182; H04N 9/3185

See application file for complete search history.

(56) References Cited

U.S. PATENT DOCUMENTS 6,275,271 B1 8/2001 Hitomi et al.
2003/0214510 A1* 11/2003 Tajima .................... H04N 9/31
345/600

(Continued)

FOREIGN PATENT DOCUMENTS

JP 2000-259126 9/2000
JP 2002-031847 1/2002

(Continued)

OTHER PUBLICATIONS

International Search Report of PCT application No. PCT/JP2015/000051 dated Mar. 31, 2015.

(Continued)

*Primary Examiner* — Brian Yenke
*Assistant Examiner* — Sean Haiem
(74) *Attorney, Agent, or Firm* — Greenblum & Bernstein, P.L.C.

(57) ABSTRACT

A projection system includes a projection apparatus, at least one image capture apparatus, and an arithmetic apparatus. The projection apparatus projects image light indicating image content and pattern light indicating a pattern image in which projection coordinates defined in a projection coordinate system are coded.

20 Claims, 8 Drawing Sheets (51) Int. Cl.
*H04N 5/74* (2006.01)
*H04N 5/225* (2006.01)
*H04N 19/44* (2014.01)
*G03B 17/54* (2006.01)
*G03B 21/14* (2006.01)

(52) U.S. Cl.
CPC ............... *H04N 5/74* (2013.01); *H04N 19/44* (2014.11); *H04N 9/3182* (2013.01); *H04N 9/3185* (2013.01)

(56) References Cited

U.S. PATENT DOCUMENTS

| | | | | |
|---|---|---|---|---|
| 2005/0129230 A1* | 6/2005 | Mihota | ............... | H04N 5/913 380/203 |
| 2010/0321382 A1* | 12/2010 | Amaratunga | ............ | H04N 5/74 345/419 |
| 2011/0216051 A1* | 9/2011 | Ishiyama | ............... | G03B 21/00 345/207 |
| 2015/0036105 A1* | 2/2015 | Ide | ....................... | H04N 9/3129 353/31 |
| 2015/0103257 A1* | 4/2015 | Nakashin | ............. | H04N 9/3194 348/746 |
| 2015/0186039 A1* | 7/2015 | Ide | ........................ | G06F 3/0425 345/168 |
| 2015/0348313 A1* | 12/2015 | Fuchikami | ............. | G06T 15/20 348/333.01 |

FOREIGN PATENT DOCUMENTS

| | | |
|---|---|---|
| JP | 2003-333611 | 11/2003 |
| JP | 2004-140845 | 5/2004 |
| JP | 2005-151418 | 6/2005 |
| JP | 2005-258622 | 9/2005 |
| JP | 2012-018214 | 1/2012 |
| JP | 2012-530941 | 12/2012 |
| JP | 2013-192189 | 9/2013 |
| WO | 2010/055625 | 5/2010 |
| WO | 2013/084559 | 6/2013 |

OTHER PUBLICATIONS

Joji Takei et al., "3000-fps 3-D Shape Measurement Using a High-Speed Camera-Projector System" IEEE/RSJ International Conference on Intelligent Robots and Systems, 2007.

\* cited by examiner

PROJECTION SYSTEM AND SEMICONDUCTOR INTEGRATED CIRCUIT

BACKGROUND

1. Technical Field

The present disclosure relates to a projection system and a semiconductor integrated circuit used in the projection system.

2. Description of the Related Art

A technique for projecting image content onto objects including, for example, structures such as buildings, that is, a technique called projection mapping, is known. Among projection mapping systems, there are systems having image capture functions.

Japanese Unexamined Patent Application Publication No. 2005-258622, for example, discloses a system capable of simultaneously obtaining a 3D shape of a subject and capturing an image of the subject using visible light.

SUMMARY

It has been desired for the above-described conventional projection systems to improve a technique for projecting image content onto a structure that is a projection target while positioning the image content as intended.

One non-limiting and exemplary aspect of the present disclosure is a projection system capable of projecting image content onto a structure while positioning the image content as intended.

In one general aspect, the techniques disclosed here feature a projection system including a projection apparatus that projects image light indicating image content and pattern light including a pattern image corresponding to information in which projection coordinates in a projection coordinate system are coded, at least one image capture apparatus, and an arithmetic apparatus. The at least one image capture apparatus generates a captured image in an image capture coordinate system by capturing reflection pattern light based on the pattern light projected onto an object from the projection apparatus. The arithmetic apparatus decodes the captured image into projection coordinate information indicating the projection coordinates corresponding to image capture coordinates in the image capture coordinate system, converts the projection coordinate information into information regarding a distance to the object in the projection coordinate system, and determines contents of the image content in accordance with the distance information. The pattern light includes first pattern light projected in a first period and second pattern light radiated in a second period. The image light includes first image light projected in a third period and second image light radiated in a fourth period. The third period is continuous with the first period, the second period is continuous with the third period, and the fourth period is continuous with the second period. The distance information includes first distance information determined on the basis of the first pattern light. The contents of the image content include first image content determined on the basis of the first distance information in the third period or the second period. The second image light indicates the first image content.

According to the present disclosure, image content can be projected onto a structure while the image content is positioned as intended.

It should be noted that these general or specific aspects may be implemented as a system, a method, an integrated circuit, a computer program, a storage medium, or any selective combination thereof. The computer-readable recording medium includes, for example, a nonvolatile recording medium such as a compact disc read-only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 6:
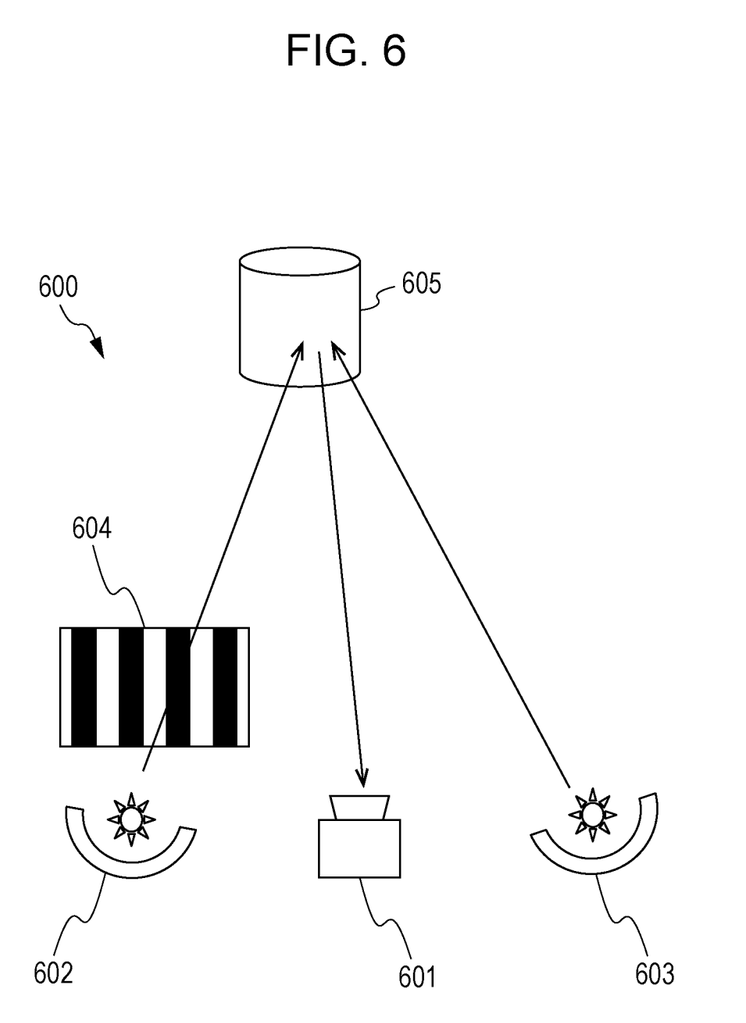
FIG. 6 is a schematic diagram illustrating an example of the configuration of a conventional system configuration.

Before describing embodiments of the present disclosure, first, a conventional measurement system 600 will be described with reference to FIG. 6.

The measurement system 600 includes an image capture apparatus 601, an infrared light source 602, a visible light source 603, and a slit 604 having a pattern. The image capture apparatus 601 can simultaneously capture images using visible light and infrared light. The image capture apparatus 601 can obtain a subject 605 onto which the visible light source 603 radiates visible light as a visible light image. In addition, infrared light radiated from the infrared light source 602 passes through the slit 604 and is radiated onto the subject 605 as pattern light. The image capture apparatus 601 can capture the radiated pattern light as an infrared image. As a result, the shape of the subject 605 can be obtained from the pattern light. Measurement of the shape of the subject 605 and obtainment of a visible light image can thus be simultaneously realized.

In a field of measurement, systems disclosed in "Development of a 3,000-fps 3D Imaging System Using a High-Speed Projector", Robotics and Mechatronics Conference Digest 2007, "1P1-M02(1)"—"1P1-M02(4)", 2007 May 11, Japanese Unexamined Patent Application Publication No. 2013-192189, and Japanese Unexamined Patent Application Publication No. 2000-259126, for example, are known as well as Japanese Unexamined Patent Application Publication No. 2005-258622.

Figure 7:
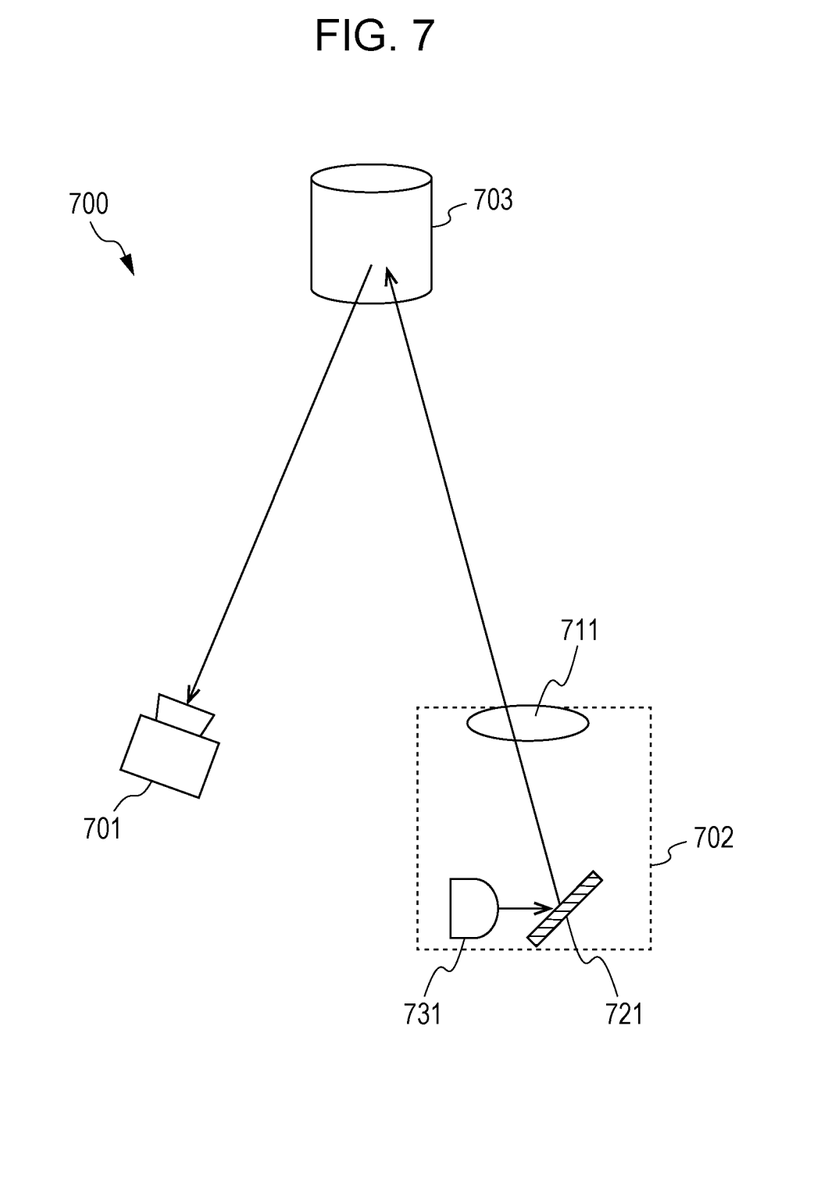
FIG. 7 is a schematic diagram illustrating an example of the configuration of the conventional system configuration.

"Development of a 3,000-fps 3D Imaging System Using a High-Speed Projector" discloses a method for measuring a 3D shape at high speed through light pattern projection. A system configuration of "Development of a 3,000-fps 3D Imaging System Using a High-Speed Projector" is illustrated in FIG. 7. A measurement system 700 includes an image capture apparatus 701 and a projection apparatus 702 including a light source 731, a lens 711, and a digital micromirror device 721. The image capture apparatus 701 has a function of performing high-speed image capture. The image capture apparatus 701 can perform high-speed image capture at, for example, 6,000 fps. The projection apparatus 702 can project binary patterns including 1,024×768 pixels at 6,000 fps or higher.

More specifically, patterns obtained by performing Manchester coding on Gray-coded bits of X coordinates of a 1,024×768 image are set to the digital micromirror device at 6,000 fps. The patterns are projected onto a projection target 703, and the image capture apparatus 701 captures an image, at 6,000 fps, of the projection target 703 onto which the patterns are projected.

Because the X coordinate ranges from 0 to 1,023, each coordinate is represented by 10 bits. After the Manchester coding, each coordinate is represented by 20 bits. Each X coordinate can therefore be obtained from 20 frames of a captured image. In addition, a distance to the projection target 703 can be obtained for each pixel through trigonometry. Results of the image capture are transmitted to a calculation apparatus (e.g., a personal computer) and analyzed. As a result of the Manchester coding, new bits of the X coordinates can be obtained for every two frames and calculated again. 3D measurement can thus be possible with a resolution of 3,000 fps as a final throughput.

Figure 8:
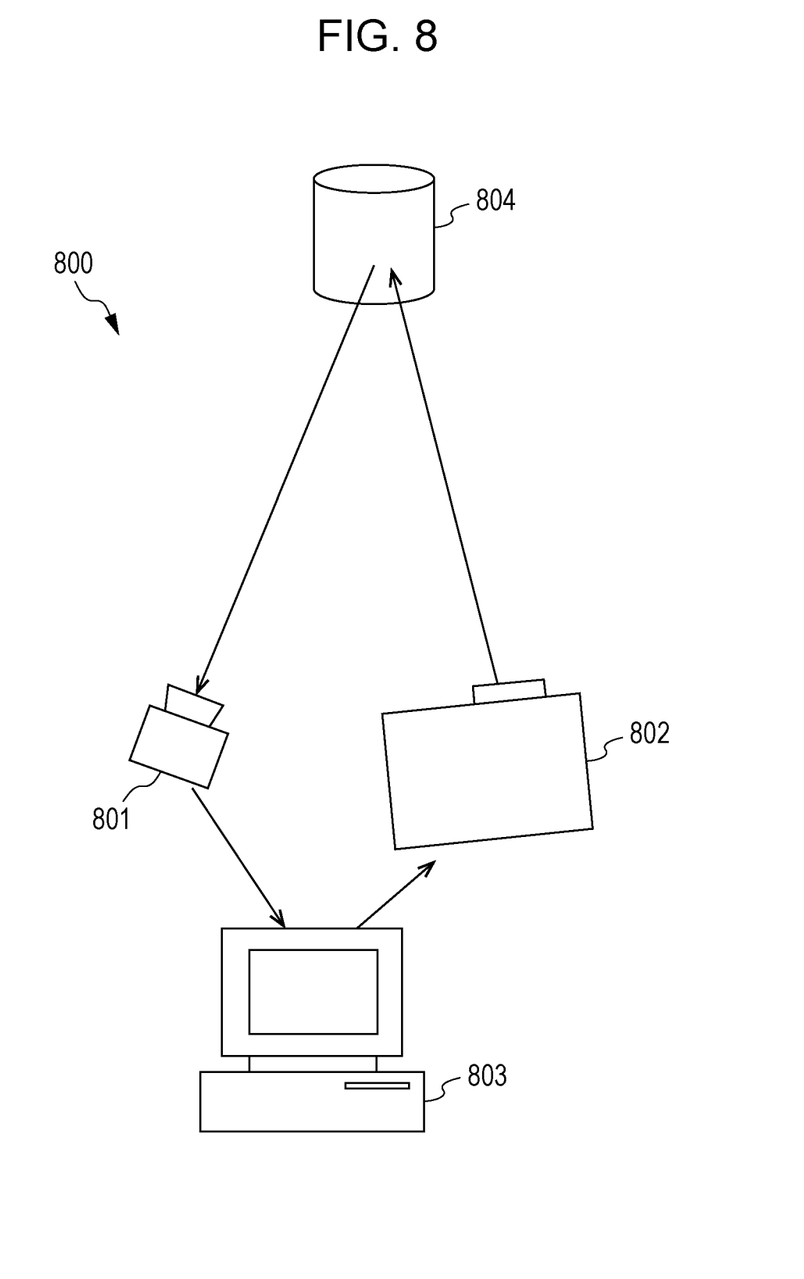
FIG. 8 is a schematic diagram illustrating an example of the configuration of the conventional system configuration.

In addition, Japanese Unexamined Patent Application Publication No. 2013-192189 discloses a measurement system that adjusts image content on the basis of image capture data. A system configuration of Japanese Unexamined Patent Application Publication No. 2013-192189 is illustrated in FIG. 8. A measurement system 800 includes an image capture apparatus 801, a projection apparatus 802, and a calculation apparatus 803. The calculation apparatus 803 recognizes an image of a projection target 804 from a result of image capture obtained from the image capture apparatus 801. The calculation apparatus 803 generates an image in such a way as to project image content onto a region in which the projection target 804 is recognized. The projection apparatus 802 projects the image content onto the projection target 804.

In addition, Japanese Unexamined Patent Application Publication No. 2000-259126 discloses tone display of a visible image in which a digital micromirror device is used. When the digital micromirror device that can only perform ON/OFF digital output performs tone display, ON/OFF of the digital micromirror device is controlled for each subfield in order to express tone. In doing so, tone can be controlled in a shorter period of time than when ON/OFF for the entirety of a field is controlled every time.

Examined problems of the background art will be described hereinafter for the present disclosure.

When image content is projected onto a structure that is a projection target in projection mapping or the like, the image content needs to be positioned as intended and projected onto the structure. Ultimately, information regarding a geometric position of the structure viewed from a coordinate system of a projection apparatus needs to be obtained.

In addition, when projection is performed onto a still structure, it is sufficient that preliminary measurement be performed once separately from projection. In this case, interference between projection and measurement can be neglected. On the other hand, it is assumed that 3D measurement is performed on a dynamically moving and/or metamorphosing object and real-time projection is performed on the object without an error on the basis of results of the 3D measurement. In this case, measurement needs to be performed without affecting image content that is being projected.

Japanese Unexamined Patent Application Publication No. 2005-258622, however, only discloses measurement that is not affected by visible light from a visible light source mounted in another place by projecting pattern images for 3D measurement using invisible light. According to the technique of Japanese Unexamined Patent Application Publication No. 2005-258622, only measurement results according to a coordinate system of the image capture apparatus can be obtained.

In addition, "Development of a 3,000-fps 3D Imaging System Using a High-Speed Projector", too, only discloses a technological level for performing 3D measurement at high speed. Because tens of frames of an image are necessary to transmit coordinate information regarding the projection apparatus, it has been difficult to perform the 3D measurement on a moving object. The technique of "Development of a 3,000-fps 3D Imaging System Using a High-Speed Projector" is meaningful in that it has suggested the possibility of high-speed measurement.

Nevertheless, whereas "Development of a 3,000-fps 3D Imaging System Using a High-Speed Projector" discloses a technique that can be used only for 3D measurement, it does not at all refer to the coordinate system of the projection apparatus. In addition, "Development of a 3,000-fps 3D Imaging System Using a High-Speed Projector" refers to offline processing after high-speed image capture, that is, non-real-time processing. To begin with, a computer architecture apparatus such as a personal computer that is intended for image processing at 60 Hz or so causes a delay of tens of milliseconds or more during input and output. As a result, it is difficult to project an image onto a moving object while capturing an image of the moving object and to feed a result of the image capture back to the projection in real-time.

According to the technique of Japanese Unexamined Patent Application Publication No. 2013-192189, parallax is caused since positions of the image capture apparatus and the projection apparatus are different from each other. Japanese Unexamined Patent Application Publication No. 2013-192189, however, does not refer to a solution to the parallax and a method for increasing the speed of the system.

In view of such problems, a projection system having a novel structure and a semiconductor integrated circuit used in the projection system have been conceived.

The present disclosure provides a projection apparatus capable of superimposing coordinate information using the same optical system as in image projection without affecting visible light as much as possible. In addition, the present disclosure provides a method for converting results of geometric measurement based on a coordinate system of an image capture apparatus into results based on a coordinate system of the projection apparatus with minimum errors. Furthermore, the present disclosure provides an arithmetic circuit that feeds back coordinate information in real-time.

An outline of an aspect of the present disclosure is as follows.

A projection system according to an aspect of the present disclosure includes a projection apparatus that projects image light indicating image content and pattern light including a pattern image corresponding to information in which projection coordinates in a projection coordinate system are coded, at least one image capture apparatus, and an arithmetic apparatus. The at least one image capture apparatus generates a captured image in an image capture coordinate system by capturing reflection pattern light based on the pattern light projected onto an object from the projection apparatus. The arithmetic apparatus decodes the captured image into projection coordinate information indicating the projection coordinates corresponding to image capture coordinates in the image capture coordinate system, converts the projection coordinate information into information regarding a distance to the object in the projection coordinate system, and determines contents of the image content in accordance with the distance information. The pattern light includes first pattern light projected in a first period and second pattern light radiated in a second period. The image light includes first image light projected in a third period and second image light radiated in a fourth period. The third period is continuous with the first period, the second period is continuous with the third period, and the fourth period is continuous with the second period. The distance information includes first distance information determined on the basis of the first pattern light. The contents of the image content include first image content determined on the basis of the first distance information in the third period or the second period. The second image light indicates the first image content.

According to this configuration, the same projection apparatus can perform image projection and measurement.

According to this configuration, occurrence of a discrepancy between projection and discrepancy can be fundamentally suppressed, and superimposition of geometric measurement that does not interfere with a visible light image can be realized. In addition, projection of image content can be performed while positioning the image content on a structure as intended.

According to a certain aspect, the projection apparatus may superimpose the pattern light upon the image light using a digital watermark method and projects resultant light.

According to this configuration, lower bits at which the visibility of a visible light image is not high can be effectively used.

According to a certain aspect, the image light may be visible light, and the pattern light may be invisible light.

According to this configuration, the image light can be visually recognized by humans without being affected by the pattern light.

According to a certain aspect, the invisible light may be infrared light.

According to this configuration, the image light can be visually recognized by humans without being affected by the pattern light.

According to a certain aspect, the image light may have a first wavelength at which ultraviolet curable resin is cured, and the pattern light may have a second wavelength that is different from the first wavelength. The image light may have ultraviolet wavelengths (e.g., 100 nm to 400 nm) suitable for stereolithography for curing ultraviolet curable resin, which has been put to practical use as one of methods used for 3D printers and the like, and the pattern light may have wavelengths of visible light beams and near-infrared light beams (e.g., 400 nm to 1,000 nm), which barely affect stereolithography, longer than those of ultraviolet rays.

According to this configuration, because states of a work and material resin can be obtained on the basis of distance information in the projection coordinate system of the projection apparatus, stereolithography can be finely controlled with small errors.

According to a certain aspect, at least one of an installation position, an image capture direction, and zoom magnification of the at least one image capture apparatus may dynamically change.

According to this configuration, resolution in measurement can be partially increased.

According to a certain aspect, the at least one image capture apparatus may include first and second image capture apparatuses. The first and second image capture apparatuses may be arranged at both sides of the projection apparatus.

According to this configuration, an occlusion region, in which projection light is radiated but cannot be captured, can be reduced.

According to a certain aspect, the at least one image capture apparatus may include first and second image capture apparatuses. The first image capture apparatus may be arranged at a closer position to the object than the second image capture apparatus is, According to this configuration, resolution in measurement can be partially increased.

According to a certain aspect, the arithmetic apparatus may obtain, from the image capture apparatus, first color information regarding a pixel identified by the image capture coordinates and determine second color information regarding the projection pixel corresponding to the first color information using the projection coordinates.

According to this configuration, the image capture apparatus can perform projection based on color information regarding a material at an accurate position of a projection target. The following therefore become possible.

First, correction can be performed such that projection onto a surface on which different colors exist looks as if the projection is performed on a uniform screen. Second, a lighting effect with high color rendering properties can be achieved so that a material of a projection target looks fresh. Third, the visibility of an existent material can be decreased and hidden. In addition, since the system can realize a small delay, deviation can be minimized even if a projection target moves.

A semiconductor integrated circuit according to an aspect of the present disclosure is used in a projection system including a projection apparatus that projects image light indicating image content and pattern light including a pattern image corresponding to information in which projection coordinates in a projection coordinate system are coded, at least one image capture apparatus that generates a captured image in an image capture coordinate system, and an arithmetic apparatus. The semiconductor integrated circuit includes a pattern decoder that decodes the captured image into projection coordinate information indicating the projection coordinates corresponding to image capture coordinates in the image capture coordinate system, a coordinate converter that converts the projection coordinate information into information regarding a distance to the object in the projection coordinate system, and a content generator that determines contents of the image content in accordance with the distance information. The captured image is generated by capturing reflection pattern light based on the pattern light projected onto an object from the projection apparatus. The arithmetic apparatus decodes the captured image into projection coordinate information indicating the projection coordinates corresponding to image capture coordinates in the image capture coordinate system, converts the projection coordinate information into information regarding a distance to the object in the projection coordinate system, and determines contents of the image content in accordance with the distance information. The pattern light includes first pattern light projected in a first period and second pattern light radiated in a second period. The image light includes first image light projected in a third period and second image light radiated in a fourth period. The third period is continuous with the first period, the second period is continuous with the third period, and the fourth period is continuous with the second period. The distance information includes first distance information determined on the basis of the first pattern light. The contents of the image content include first image content determined on the basis of the first distance information in the third period or the second period. The second image light indicates the first image content.

If the semiconductor integrated circuit is used in a projection system, occurrence of a discrepancy between projection and measurement can be fundamentally suppressed, and superimposition of geometric measurement that does not interfere with a visible light image can be realized. In addition, projection can be performed while positioning image content on a structure as intended.

Specific embodiments of the present disclosure will be described hereinafter with reference to the drawings. In the following description, the same components or similar components are given the same reference numerals. In addition, redundant description might be omitted. It is to be noted that projection systems according to embodiments of the present disclosure are not limited to ones described hereinafter as examples.

First Embodiment

The structure, functions, and operation of a projection system 100 according to the present embodiment will be described with reference to FIGS. 1 to 4.

Figure 1:
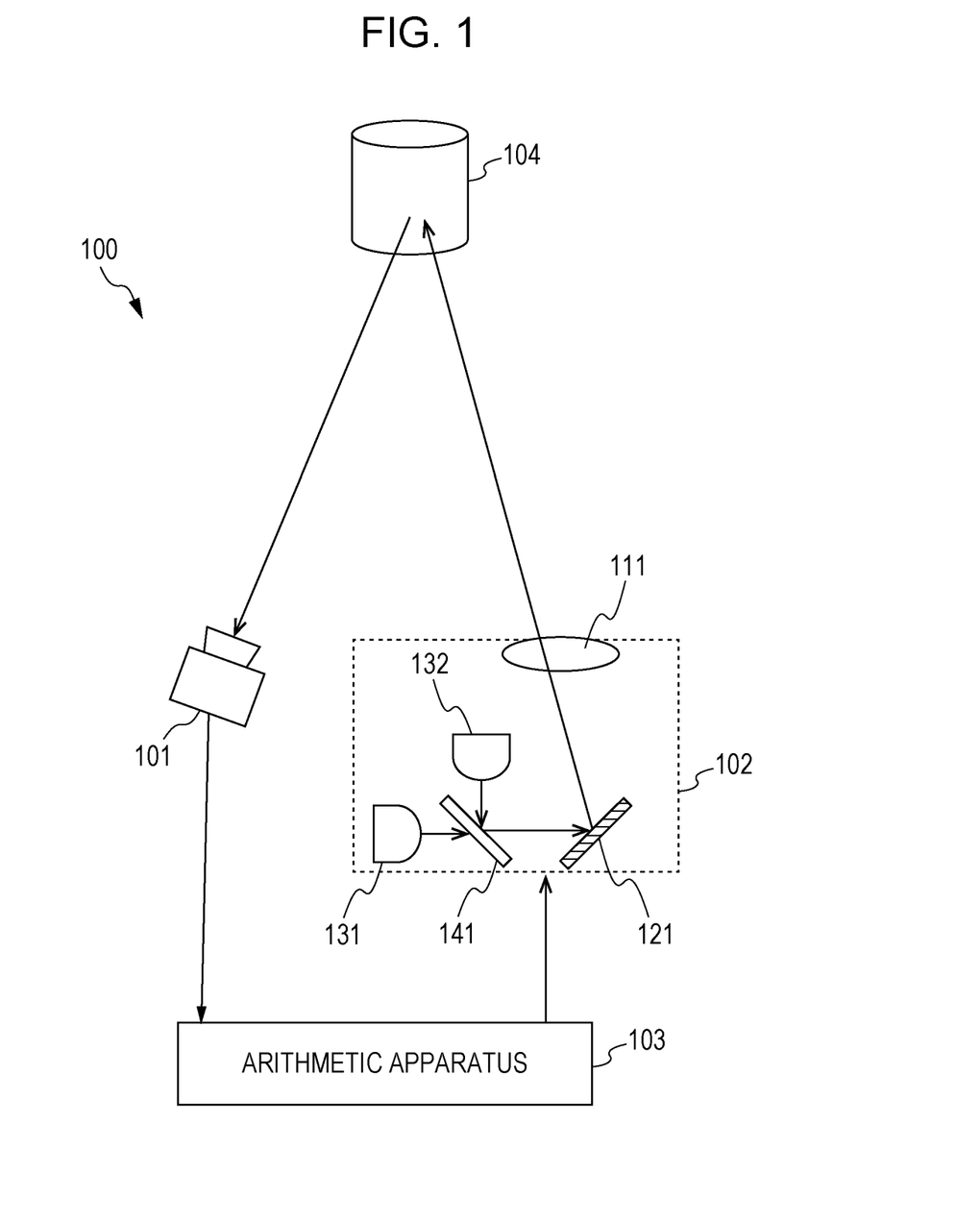
FIG. 1 is a schematic diagram illustrating an outline of the configuration of a projection system according to an exemplary first embodiment.

FIG. 1 schematically illustrates an example of an outline of the configuration of the projection system 100. The projection system 100 includes an image capture apparatus 101, a projection apparatus 102, and an arithmetic apparatus 103.

In the present embodiment, the image capture apparatus 101 can perform image capture at 6,000 frames per second as in "Development of a 3,000-fps 3D Imaging System Using a High-Speed Projector". In addition, the image capture apparatus 101 includes a large transmission band therein that does not require buffering and can output image capture data to the arithmetic apparatus 103. Furthermore, the image capture apparatus 101 has sensitivity in an infrared light region. With these conditions in mind, an example of functions and the operation of each apparatus will be described hereinafter.

The projection apparatus 102 projects image light indicating image content and pattern light indicating pattern images in which projection coordinates defined in a projection coordinate system are coded. The projection coordinate system herein refers to a coordinate system identifying coordinates of each pixel of an image of image content, which is a projected image. Coordinates identifying each pixel of an image of image content will be referred to as "projection coordinates" in the projection coordinate system.

The projection apparatus 102 typically includes a lens optical system 111, a visible light light-emitting diode (LED) light source 131, an infrared LED light source 132, a dichroic mirror 141, and a digital micromirror device 121.

The lens optical system 111 may be configured by a single lens, or may be configured by a plurality of lenses (lens group). A plurality of lenses can include, for example, a zoom lens, a focus lens, and the like.

The visible light LED light source 131 emits light in a visible light band (approximately from 380 nm to 780 nm) as image light. The visible light LED light source 131 may be a monochrome visible light source for the sake of simplification. A full-color image, however, may obviously be projected by providing three light sources for three colors of red, blue, and green. Alternatively, if there is a color wheel that can rotate at a sufficiently high speed, a white light source such as a high-pressure mercury-vapor lamp may be included instead of the visible light LED light source 131, and a full-color image can be projected by providing the white light source for the output.

In addition, a light source capable of obtaining light from a high-pressure mercury-vapor lamp for each wavelength using a dichroic prism may be used as the visible light LED light source 131. Any kind of light source may thus be used in the present disclosure.

The infrared LED light source 132 emits invisible light as the pattern light. The invisible light has a wavelength in, for example, an infrared light band (approximately from 700 nm to 1,000 nm). Although the infrared LED light source 132 is used as an invisible light source in the present embodiment, a light source that emits ultraviolet rays may be used, instead.

The digital micromirror device 121 is a device in which micromirrors are arranged in a matrix of, for example, 1,024×768. The digital micromirror device 121 can output an image at 30,000 frames per second as binary patterns. It is to be noted that the digital micromirror device 121 can be replaced by a liquid crystal device.

Characteristics of the dichroic mirror 141 allow visible light to pass through the dichroic mirror 141 but cause infrared light to be reflected. Any of known dichroic mirrors may be used as the dichroic mirror 141.

The image capture apparatus 101 captures pattern light and generates an image of the captured pattern light. The image capture apparatus 101 includes an image sensor, a lens optical system, and the like. An image sensor having 1,024×768 pixels, for example, may be used in combination with the digital micromirror device 121. In this case, if a pixel has a resolution of 8 bits, a transmission band is about 38 Gbps. It is assumed that, for example, the arithmetic apparatus 103 is realized by a field-programmable gate array (FPGA). Considering a current semiconductor technology level, a transmission band of about 38 Gbps is quite feasible.

The image capture apparatus 101 has an image capture coordinate system. The image capture coordinate system herein refers a coordinate system identifying coordinates of each pixel in a captured image obtained by the image capture apparatus 101. The coordinates of each pixel of a captured image will be referred to as "image capture coordinates" in the image capture coordinate system in distinction from the "projection coordinates".

The arithmetic apparatus 103 decodes a captured image into projection coordinate information indicating projection coordinates corresponding to image capture coordinates defined in the image capture coordinate system and converts the projection coordinate information into information regarding distances to a structure in the projection coordinate system. The arithmetic apparatus 103 then selectively determines contents of image content in accordance with the distance information.

Figure 2:
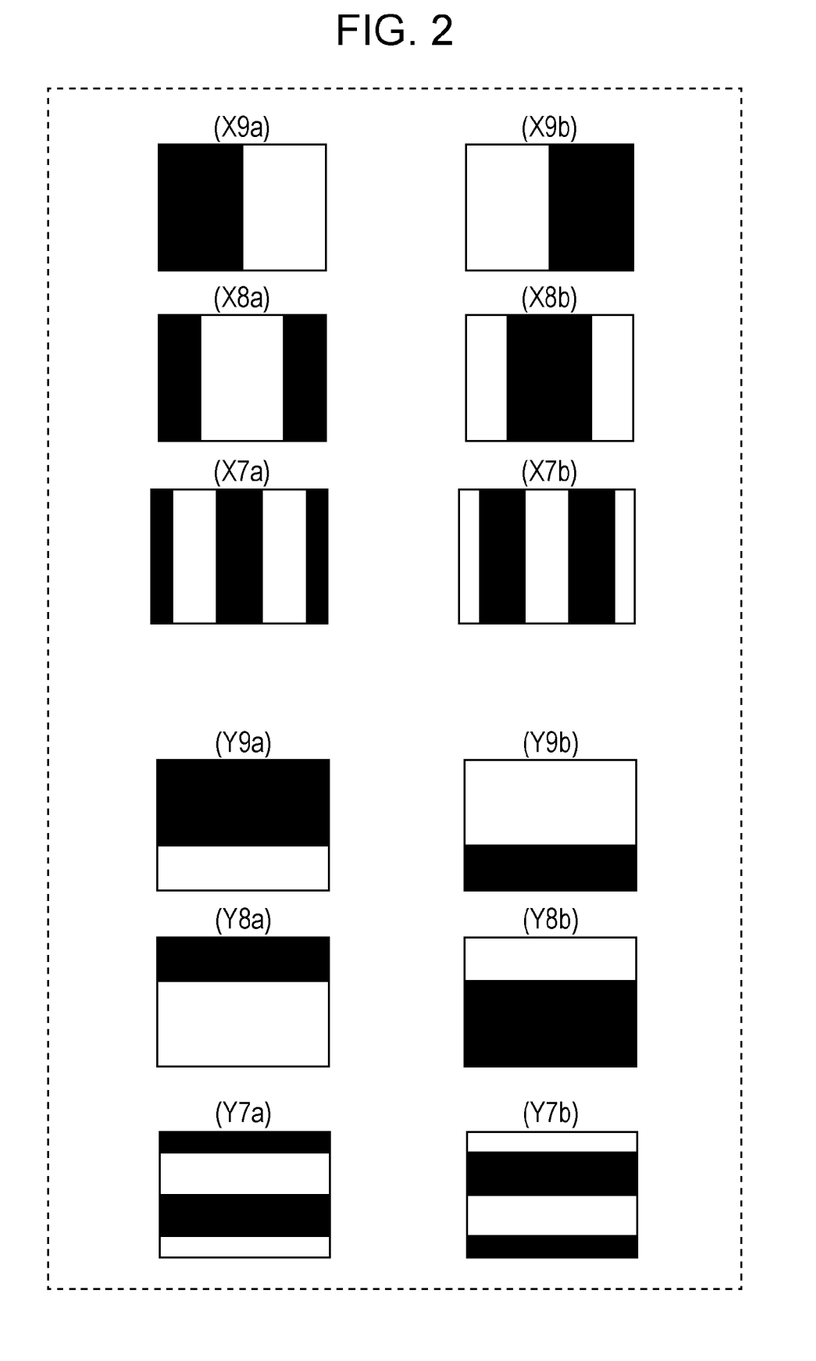
FIG. 2 is an image diagram illustrating an example of part of coded pattern images corresponding to pattern light.

FIG. 2 illustrates an example of part of coded pattern images (coordinate patterns) corresponding to pattern light. The pattern images illustrated in FIG. 2 are obtained by performing Gray coding on X and Y coordinates of each mirror of the digital micromirror device 121, which includes the 1,024×768 micromirrors, and representing each bit as a binary image in black and white.

The projection apparatus 102 can project pattern light onto a structure 104 on the basis of, for example, a pattern image of 1,024×768 pixels. X coordinates and Y coordinates of pixels are more than 512 but fewer than 1,024. In this case, 10 bits, namely bit 0 to bit 9, representing the X coordinates are subjected to Gray coding. As with the X coordinates, 10 bits, namely bit 0 to bit 9, representing the Y coordinates are subjected to Gray coding. Coordinate information can thus be coded by assigning 10 bits to each coordinate, that is, by assigning a total of 20 bits. An example will be described hereinafter in which the 20-bit information is coded using image data regarding 40 frames.

FIG. 2 is an image diagram illustrating typical 12 pattern images included in 40 pattern images in an example in which coding is performed using the 40 pattern images. (X9a) illustrated in FIG. 2 indicates a pattern image corresponding to bit 9 after the X coordinates are subjected to Gray coding. In addition, since the projection coordinates are coded through Manchester coding in the present embodiment, a reverse pattern image obtained by performing bit reversal on bit 9 is also used. (X9b) illustrated in FIG. 2 indicates a reverse pattern image obtained by reversing the image pattern indicated by (X9a). Similarly, (X8a) illustrated in FIG. 2 indicates a pattern image corresponding to bit 8 after the X coordinates are subjected to Gray coding, and (X8b) indicates a reverse pattern image obtained by reversing the image pattern indicated by (X8a). (X7a) illustrated in FIG. 2 indicates a pattern image corresponding to bit 7 after the X coordinates are subjected to Gray coding, and (X7b) indicates a reverse pattern image obtained by reversing the image pattern indicated by (X7a).

(Y9a) illustrated in FIG. 2 indicates a pattern image corresponding to bit 9 after the Y coordinates are subjected to Gray coding. (Y9b) illustrated in FIG. 2 indicates a reverse pattern image obtained by reversing the image pattern indicated by (Y9a). Similarly, (Y8a) illustrated in FIG. 2 indicates a pattern image corresponding to bit 8 after the Y coordinates are subjected to Gray coding, and (Y8b) indicates a reverse pattern image obtained by reversing the image pattern indicated by (Y8a). (Y7a) illustrated in FIG. 2 indicates a pattern image corresponding to bit 7 after the Y coordinates are subjected to Gray coding, and (Y7b) indicates a reverse pattern image obtained by reversing the image pattern indicated by (Y7a).

Although not illustrated, there are also pattern images and reverse pattern images corresponding to bits 6 to 0, for example, of the X coordinates and the Y coordinates insofar as resolution is measurable. The projection apparatus 102 sequentially projects the 40 patterns including these patterns onto the structure 104. The image capture apparatus 101 sequentially captures the projected pattern images.

Next, details of the structure and functions of the arithmetic apparatus 103 will be described with reference to FIGS. 3 and 4.

Figure 3:
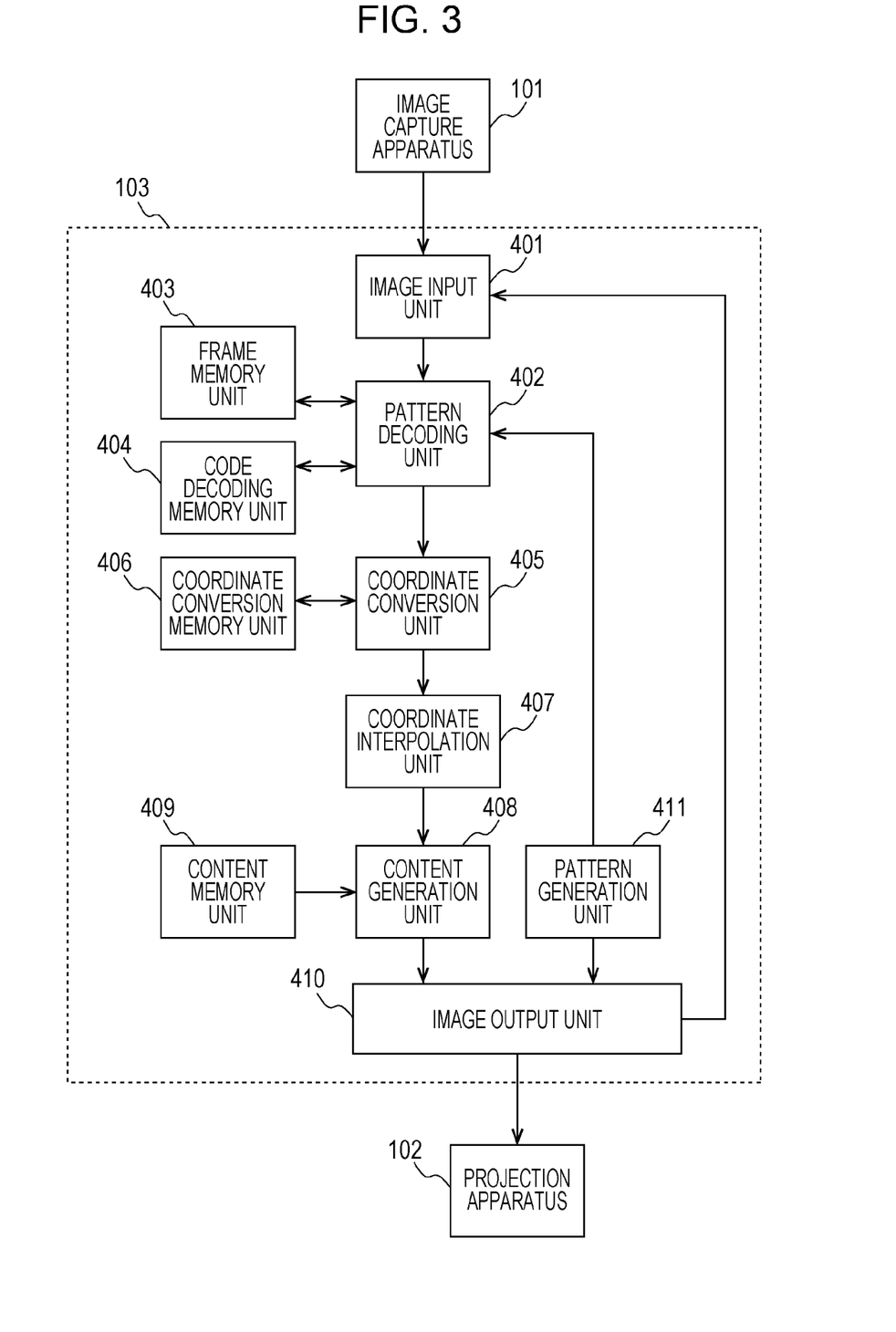
FIG. 3 is a functional block configuration diagram of an arithmetic apparatus according to the exemplary first embodiment.

FIG. 3 illustrates an example of a functional block configuration of the arithmetic apparatus 103. The arithmetic apparatus 103 has a function of controlling the entirety of the projection system. The arithmetic apparatus 103 can be realized by, for example, a computer, an arithmetic apparatus typified by a processor, or a semiconductor integrated circuit. The semiconductor integrated circuit is, for example, an application-specific integrated circuit (ASIC), an FPGA, or the like. Computer programs for achieving functions of components are stored in a memory, and the functions of the components may be realized by the processor in the semiconductor integrated circuit that sequentially executes the computer programs.

The arithmetic apparatus 103 includes an image input unit 401, a pattern decoding unit 402, a frame memory unit 403, a code decoding memory unit 404, a coordinate conversion unit 405, a coordinate conversion memory unit 406, a coordinate interpolation unit 407, a content generation unit 408, a content memory unit 409, an image output unit 410, and a pattern generation unit 411. Each memory unit in the arithmetic apparatus 103 can be configured by, for example, a read-only memory (RAM) or the like.

Figure 4:
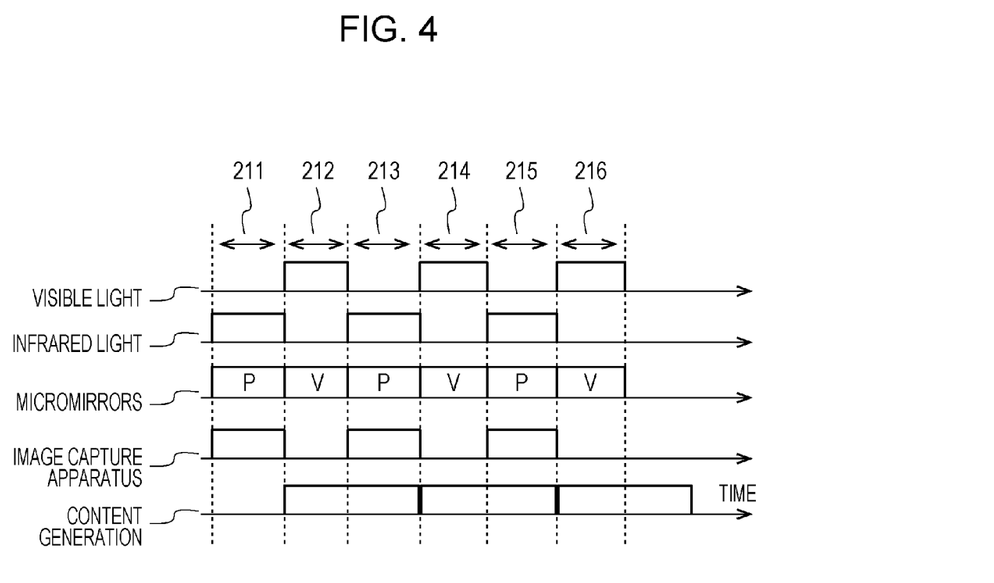
FIG. 4 is a timing chart of the projection system according to the exemplary first embodiment.

FIG. 4 illustrates a timing chart of the projection system 100 according to the present embodiment. As illustrated in FIG. 4, the projection apparatus 102 projects pattern light in periods 211, 213, and 215 and image light in periods 212, 214, and 216. That is, the projection apparatus 102 performs time-division multiplexing on image light and pattern light and projects resultant light. It is to be noted that, in the figure, "P" for the micromirrors indicates pattern images used for measurement, and "V" indicates image content as a projected image.

First, in the period 211, the pattern generation unit 411 turns on the infrared LED light source 132. The pattern generation unit 411 generates pattern images for pattern projection using the above-described method. The pattern generation unit 411 outputs image data indicating the pattern images to the image output unit 410 so that pattern projection for measurement is performed at the digital micromirror device 121. The image output unit 410 outputs the image data transmitted from the pattern generation unit 411 and turn-on information regarding the infrared LED light source 132 to the projection apparatus 102. Since the pattern light indicating pattern images is projected as infrared light, the pattern light can be measured by the image capture apparatus 101 but does not affect the visual sensation of humans.

The pattern generation unit 411 can output a pattern in $\frac{1}{6,000}$ second. In the period 211, the pattern generation unit 411 outputs a total of 40 frames including 10-bit coordinate images for the X coordinates and the Y coordinates and their reverse images. On the other hand, the image capture apparatus 101 performs image capture at 40 frames in synchronization with a rate at which the digital micromirror device 121 outputs the frames. In this example, the length of the period 211 is 6.7 milliseconds.

In addition, the image output unit 410 outputs the pattern images to the projection apparatus 102 in synchronization with output timings of the pattern generation unit 411. The image input unit 401 controls the exposure of the image capture apparatus 101 in synchronization with output timings of the image output unit 410 in order to perform the image capture at 40 frames.

The image input unit 401 receives the captured images (image capture data) captured by the image capture apparatus 101. The image input unit 401 transmits the received image capture data to the pattern decoding unit 402. The image input unit 401 determines patterns corresponding to the image capture data received in synchronization with the image output unit 410.

The pattern decoding unit 402 decodes the captured images indicating the pattern images from the image capture apparatus 101 into projection coordinate information indicating projection coordinates corresponding to image capture coordinates defined in the image capture coordinate system. Functions of the pattern decoding unit 402 will be described in more details later.

If the image capture data received from the image input unit 401 is an X and Y coordinate non-bit reverse image, the pattern decoding unit 402 writes the image capture data to the frame memory unit 403. If the image data is an X and Y coordinate bit reverse image, the pattern decoding unit 402 reads a non-bit reverse image recorded earner in the frame memory unit 403 and obtains a difference between the two. By obtaining the difference, "0" and "1" of projection light can be distinguished without depending on the color of the projection target or ambient light. A region in which the difference is equal to or smaller than a certain value is determined as a region onto which projection light is not projected, and the region can be excluded from regions to be measured.

A write field is provided in the code decoding memory unit 404 for each pixel of the image capture apparatus 101. After obtaining the difference, the pattern decoding unit 402 writes each bit value of Gray-coded coordinate data to the write field in units of bits. This operation is performed for the 40 frames during exposure periods of the image capture apparatus 101. As a result, information indicating whether an X coordinate and a Y coordinate of the projection apparatus 102 corresponding to each pixel of the image capture apparatus 101 exist and, if the X coordinate and the Y coordinate exist, 10-bit values indicating each of the X coordinate and the Y coordinate are written to the code decoding memory unit 404. The pattern decoding unit 402 lastly converts the Gray-coded coordinate data recorded in the code decoding memory unit 404 into binary data again and outputs the binary data to the coordinate conversion unit 405.

As a result of the above-described process, it is possible to know which of the pixels of the projection apparatus 102 has projected projection light captured at a certain pixel position of the image capture apparatus 101. That is, a correlation between projection coordinates and image capture coordinates defined in the image capture coordinate system of the image capture apparatus can be identified. If a positional relationship between the image capture apparatus 101 and the projection apparatus 102 is known, therefore, a distance to the structure can be obtained for each image capture pixel through trigonometry. The obtained information, however, is distance information corresponding to the image capture pixels of the image capture apparatus 101. In the present embodiment, therefore, the information is converted into distance information corresponding to pixel coordinates of the projection apparatus 102.

The coordinate conversion unit 405 writes data received from the pattern decoding unit 402 to a field of the coordinate conversion memory unit 406 identified by an address corresponding to projection coordinates of the projection apparatus 102. The coordinate conversion unit 405 then sequentially reads distance information from the coordinate conversion memory unit 406 in order of the X coordinates and the Y coordinates of the projection apparatus 102 to generate the distance information corresponding to the projection coordinates of the projection apparatus 102.

At this time, there can be a projection pixel that has no corresponding point. More specifically, one of the image capture pixels of the image capture apparatus 101 can capture light corresponding to a plurality of certain pixels among the pattern images projected onto the structure. In this case, a projection pixel that has no corresponding point is rounded to one of two adjacent projection pixels due to characteristics of Gray codes, and one of the two projection pixels does not have a corresponding point.

The coordinate interpolation unit 407 receives the distance information corresponding to the projection coordinates of the projection apparatus 102 from the coordinate conversion unit 405. The coordinate interpolation unit 407 interpolates the distance information into projection coordinates for which distance information does not exist. The interpolation is performed on the basis of distance information regarding nearby coordinates using an interpolation method such as linear interpolation, insofar as there are a certain number of projection coordinates having distance information that can be used for the interpolation around the projection coordinates in question. The coordinate interpolation unit 407 outputs distance information based on the projection coordinates to the content generation unit 408.

The content generation unit 408 generates, over the periods 212 and 213, image content to be projected. The content generation unit 408 processes image content recorded in the content memory unit 409 in advance on the basis of the distance information received from the coordinate interpolation unit 407 and outputs the processed image content to the image output unit 410. The processed image content might also be referred to as "image content after the processing" hereinafter in distinction from the image content before the processing recorded in advance.

The content generation unit 408 generates image content that does not include coordinate deviations and that accurately corresponds to the distances to the structure. In addition, the content generation unit 408 can selectively determine contents of the image content in accordance with the distance information. A process for capturing and detecting an object located at a certain distance and accurately drawing image content for visible light projection, for example, can be performed. The content generation unit 408 outputs the image content for projection after the processing to the image output unit 410.

In the period 214, the image output unit 410 outputs the image content for visible light projection generated in the periods 212 and 213 to the projection apparatus 102.

Thereafter, the visible light LED light source 131 is turned on, and the digital micromirror device 121 outputs projection light corresponding to the image content. The digital micromirror device 121 can output 30,000 binary frames per second. An image of 256 tones, for example, can therefore be projected in 8.5 milliseconds using 255 frames. Since this projection is realized by a visible light source, humans can visually recognize the projected image.

In the period 213, the pattern images are projected and captured using infrared light as in the period 211 in parallel with the generation of the image content for projection. Over the periods 214 and 215, the content generation unit 408 generates image content that does not include coordinate deviations and that accurately corresponds to the distances to the structure. In the period 216, the projection apparatus 102 projects the image content for projection. The measurement and the projection can thus be sequentially performed.

If a measurement time (the period 211) lasts 6.7 milliseconds and a projection time (the period 212) lasts 8.5 milliseconds, a repetition period of the measurement and the projection is 15.2 milliseconds. This means that the measurement and the projection can be realized with a throughput of 60 Hz or more. In addition, time (hereinafter referred to as a "delay time") taken to reflect a result of the measurement since the measurement may be the same as the repetition period, namely 15.2 milliseconds. Since a throughput of 60 Hz or more can be achieved, a flicker of a projected image due to a non-display time such as the measurement period, in which image content is not projected, can be reduced enough not to be recognized by human eyes. It is to be noted that in FIG. 4, the delay time corresponds to a total length of the periods 212 and 213.

According to the present embodiment, occurrence of a discrepancy between the projection and the measurement can be fundamentally suppressed, and superimposition of geometric measurement that does not interfere with a visible light image can be realized by performing the image projection and the measurement using the same projection apparatus.

In addition, according to the present embodiment, if the arithmetic apparatus 103 can decode pattern images captured by the image capture apparatus 101, relative position measurement can be tolerated. Practical use can therefore be realized even if the accuracy of installation is not sufficiently secured. In this sense, the simplicity of installation can be secured. In addition, high robustness can be achieved against an increase in errors relating to installation due to long-term degradation.

Modifications of the present embodiment will be described hereinafter.

In the present embodiment, both the X coordinates and the Y coordinates are used. The present disclosure, however, is not limited to this. If the image capture apparatus 101 and the projection apparatus 102 are arranged such that parallax is caused only in one axial direction, the number of pattern images used can be reduced by half when distances to an object are calculated.

In addition, in the present embodiment, as in "Development of a 3,000-fps 3D Imaging System Using a High-Speed Projector", a Manchester coding method in which reverse bits are alternately transmitted has been described as an example. The present disclosure, however, is not limited to this method. If differences are obtained after pattern images are generated in advance using an all-zero pattern image and an all-one pattern image as references, measurement can be performed with fewer pattern images than in the Manchester coding method. By adopting such a method, the length of the period 211 can be further reduced.

In addition, if a method in which distance information is updated not after all coordinate bits are scanned but each time a new bit is obtained is adopted as in the method of "Development of a 3,000-fps 3D Imaging System Using a High-Speed Projector", the period 211 can be time taken to capture two frames. As a result, the length of the period 211 can be 333 microseconds.

After the measurement, a delay is caused before a result of the measurement is reflected by the projection. With respect to this delay, the image content for projection is generated over the periods 212 and 213 on the basis of a result of image capture, and the image content after the processing is projected in the period 214 in the present embodiment. If the content generation can be performed in a short period of time in the period 211, however, its result can be reflected in the next period 212 through the visible light projection.

In the present embodiment, for example, a result of measurement is treated as three-dimensional data including distances to an object. The present disclosure, however, is fairly effective even when positioning is simply performed while treating a result of measurement as 2D data. If a projection region is simply determined, a threshold (e.g., a threshold according to distances to an object) may be provided for data transmission. As a result, time taken to generate image content can be significantly reduced.

With respect to the projection of image content (image light), too, it is known that tones can be expressed in a shorter period of time by providing subfields between frames and updating the subfields, not by updating all the frames as in "Development of a 3,000-fps 3D Imaging System Using a High-Speed Projector". By combining such a technique with the present disclosure, an overall frame rate can be further improved.

According to a conventional technique, a computer architecture includes a drawing system that mainly performs image processing at 60 Hz. If the computer architecture calculates parallax caused by the positional deviation of the image capture apparatus on the basis of a captured image captured at a different position from the projection apparatus, at least a delay of 33 milliseconds or more can be caused including buffering. As a result, if the conventional technique is applied to a bowling alley or the like, for example, a ball undesirably moves some 495 millimeters between measurement and projection, which means it is difficult to put the conventional technique to practical use.

On the other hand, according to the present disclosure, the delay can be further reduced depending on the configuration. More specifically, a result of measurement can be reflected by projection with a delay of shorter than 1 millisecond. If a system that causes a delay of about 1 millisecond is constructed, for example, an error between measurement and projection can be suppressed to 10 millimeters or less even with an object that moves 10 meters per second. Considering the dynamics of the system including a measurement target, accuracy and delays are in a trade-off relationship, and, in practice, the system may be adjusted in consideration of the relationship.

The present disclosure is optimal for a projection mapping system having interactivity. When image content is projected in accordance with the movement of a ball in a bowling alley, for example, a world record of the speed of a ball is about 15 meters per second. If projection can be performed with a delay of 1 millisecond or less, the deviation of image content can be 15 millimeters or less. Since a result of measurement is obtained in the projection coordinate system of the projection apparatus in the present embodiment, image content for projection can be processed at extremely high speed.

In the present embodiment, the projection system 100 includes a single image capture apparatus 101. By providing at least two image capture apparatuses 101 for both sides of the projection apparatus 102, however, an occlusion region, in which projection light is radiated but cannot be captured, can be reduced.

In the present embodiment, at least one of an installation position, an image capture direction, and zoom magnification of the image capture apparatus 101 can be dynamically changed. In addition, by adding an image capture apparatus in which at least resolution or zoom magnification is different and/or an image capture apparatus whose distance to an object is different, resolution in measurement can be partially increased. The projection system 100 may include, for example, first and second image capture apparatuses. At this time, the first image capture apparatus can be arranged at a closer position to an object (structure) than the second image capture apparatus is.

Furthermore, a conventional projection apparatus illustrated in FIG. 7 may be used instead of the infrared LED light source 132. In this case, the pattern light for measurement is also projected using visible light. If a Manchester coding method, for example, is used, however, the same number of zeros and ones are caused in all pixels. The pattern light is therefore not recognized by human eyes and looks as if a certain offset is provided for the image light. In this case, the offset can be subtracted from the image light for visible light in advance. This is one of types of technique such as a digital watermark and can be realized by, for example, embedding a pattern image for measurement in lower bits at which the visibility of a visible light image is not high.

In particular, if a liquid crystal device replaces the digital micromirror device 121, lower bits appear not as frames of a particular binary image but as an analog quantity of each frame. It is therefore important to superimpose pattern light upon image light using a digital watermark technique.

In the present embodiment, the image capture apparatus 101 may obtain a projected image (image content) of projection light as a first visible light image in the input unit 211 as well as the pattern images. In this case, even if the pattern light is visible light, an integral of light indicating a pattern image subjected to Manchester coding in a time direction is invariably content. A projected image can therefore be obtained using visible light just as in projection of white light. Furthermore, in the period 212, the image capture apparatus 101 may capture projection light indicating image content as a second visible light image. A change in the color of the structure 104, onto which the projection light is projected, can be detected on the basis of the second visible light image.

According to the present embodiment, image capture coordinates in the image capture coordinate system can be converted into projection coordinates in the projection coordinate system. Projection light can therefore be projected without positional deviations when projection color is adjusted using a visible light image. The visible light image at this time may be either of the first visible light image and the second visible light image, or may be an image obtained by combining the two in order to reduce the effect of a pattern component.

The present disclosure is effective in projection mapping in a field in which product display is conducted. The present disclosure is meaningful in making food materials look fresh or reproducing the color of a product as shown in a catalog without depending on ambient light. Projection light can be projected without positional deviations in accordance with the shape and/or movement of an object onto which projection light is projected.

In addition, the present disclosure is an effective technique in a field of stereolithography such as 3D printers. The 3D printers perform stereolithography by projecting ultraviolet rays indicating stereolithographic information onto ultraviolet curable resin using a projection machine for ultraviolet rays. If the visible light LED light source 131 is replaced by an ultraviolet light source, for example, stereolithography can be controlled using ultraviolet rays while measurement of 3D information is being performed using infrared rays that do not cure resin. Because states of a work and material resin can be obtained on the basis of distance information in the projection coordinate system of the projection apparatus 102, stereolithography can be finely controlled with small errors.

In addition, as another application, the system in the present disclosure can be used for headlights of automobiles. Light emitted from a headlight of an automobile is reflected by, for example, raindrops and shiny objects. The reflected light might dizzy a driver. According to the system in the present disclosure, light projected onto such objects is masked in a pinpoint manner through 3D measurement, and a safe field of view can be secured. By masking light projected onto faces (especially eyes) of passers-by and cars in an opposite lane, an effect upon human eyes can be prevented.

In addition, on the other hand, shapes to be recognized, such as signs and signboards, can be recognized, and light can be actively projected onto such objects in a pinpoint manner.

Second Embodiment

The configuration, functions, and operation of a projection system 100 according to the present embodiment will be described with reference to FIG. 5.

The projection system 100 according to the present embodiment is different from the projection apparatus 102 according to the first embodiment in that a projection apparatus 102 includes a dichroic prism 841. The structure of the projection apparatus 102 will be mainly described hereinafter.

Figure 5:
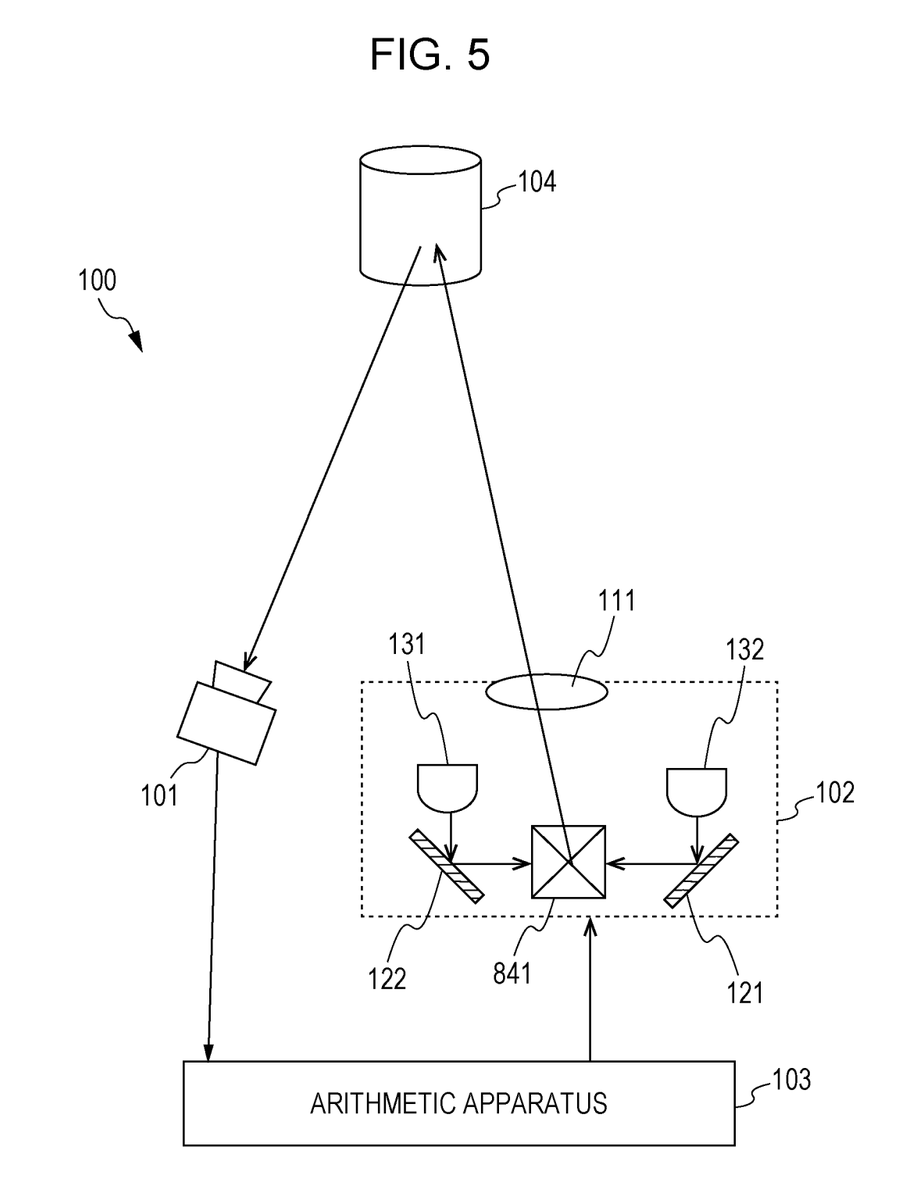
FIG. 5 is a schematic diagram illustrating an outline of the configuration of a projection system according to an exemplary second embodiment.

FIG. 5 illustrates a schematic configuration of the projection system 100 according to the present embodiment.

The projection system 100 according to the present embodiment includes an image capture apparatus 101, the projection apparatus 102, and an arithmetic apparatus 103. The projection apparatus 102 includes digital micromirror devices 121 and 122, a visible light LED light source 131, the dichroic prism 841, an infrared LED light source 132, and a lens optical system 111.

The dichroic prism 841 mixes visible light and infrared light incident from the left and right, respectively, and outputs mixture light to the lens optical system.

The image capture apparatus 101 according to the present embodiment preferably includes an image sensor substantially having sensitivity to infrared light. If so, even if the image capture apparatus 101 receives mixture light, the image capture apparatus 101 can capture pattern light, which is infrared light.

According to the projection apparatus 102 according to the present embodiment, a combination of the digital micromirror device 121 and the infrared LED light source 132 can project pattern light for distance measurement while a combination of the visible light LED light source 131 and the digital micromirror device 122 is projecting projection light that is visible light. In other words, the projection apparatus 102 can perform wavelength multiplexing on image light and pattern light and project resultant light. It is to be noted that, as described in the first embodiment, a full-color image can of course be projected by providing a color wheel for an output of the visible light LED light source 131 or three light sources for three colors of red, blue, and green.

Furthermore, as in a three-mirror projection machine, the digital micromirror devices 121 and 122 may be provided for each of red, blue, and green. In addition, by adding a digital micromirror device for infrared light to a conventional three-mirror digital micromirror device, a novel four-mirror projection machine can be realized. As a result, it is rightly expected to explore new industrial fields.

According to the present embodiment, since the number of digital micromirror devices is larger than in the first embodiment, cost accordingly increases. Since projection and measurement can be performed completely simultaneously using mixture light, however, the amount of delay can be further reduced.

According to the present disclosure, measurement and projection can be simultaneously performed using a single projection apparatus. In addition, a position of an object can be measured at extremely high speed in the projection coordinate system of the projection apparatus, and a projection mapping system that follows an object can be constructed at low cost.

Possible exemplary applications of the present disclosure will be described hereinafter.

The present disclosure is effective in lighting including interactive projection mapping for amusement purposes including movement, such as bowling, billiard, and attractions involving bodily sensation. In addition, the present disclosure is effective in lighting in events and concerts. In addition, the present disclosure is effective in interior decoration for restaurants or bars according to the movement of customers.

Furthermore, the present disclosure can be used for showcases or product display in department stores or shops. The present disclosure can be applied to an apparatus that adjusts the amount of light in order to change the color of a project in accordance with a catalog without depending on ambient light.

As another application, the present disclosure is optimal for projection of an operation guideline onto an operation space in a factory and in fields such as distribution. The present disclosure is expected to be applied to a field of 3D stereolithography and a field of machine vision such as headlights of automobiles.

Image light may have ultraviolet wavelengths (e.g., wavelengths included in 100 nm to 400 nm) suitable for stereolithography for curing ultraviolet curable resin, which has been put to practical use as one of methods used for 3D printers and the like, and pattern light may have wavelengths of visible light beams and near-infrared light beams (e.g., wavelengths included in 400 nm to 1,000 nm), which barely affect stereolithography, longer than those of ultraviolet rays.

If light in a wavelength band A included in 100 nm to 400 nm is selected as the image light and light in a wavelength band B included in 400 nm to 1,000 nm is selected as the pattern light, the wavelength band A and the wavelength band B need not necessarily overlap.

The projection system and the semiconductor integrated circuit in the present disclosure can be used in a projection mapping system.

What is claimed is:

1. A projection system comprising:
    a projection apparatus that projects image light indicating image content and pattern light including a pattern image corresponding to information in which projection coordinates in a projection coordinate system are coded;
    at least one image capture apparatus; and
    an arithmetic apparatus,
    wherein the at least one image capture apparatus generates a captured image in an image capture coordinate system by capturing reflection pattern light based on the pattern light projected onto an object from the projection apparatus,
    wherein the arithmetic apparatus
    decodes the captured image into projection coordinate information indicating the projection coordinates corresponding to image capture coordinates in the image capture coordinate system,
    converts the projection coordinate information into information regarding a distance to the object in the projection coordinate system, and
    determines contents of the image in accordance with the distance information,
    wherein the pattern light includes first pattern light projected in a first period and second pattern light projected in a second period,
    wherein the image light includes first image light projected in a third period and second image light projected in a fourth period,
    wherein the third period is continuous with the first period, the second period is continuous with the third period, and the fourth period is continuous with the second period,
    wherein the distance information includes first distance information determined on the basis of the first pattern light,
    wherein the contents of the image include first image content determined on the basis of the first distance information over the third period and the second period, and
    wherein the second image light indicates the first image content.

2. The projection system according to claim 1, wherein the projection apparatus superimposes the pattern light upon the image light using a digital watermark method and projects resultant light.

3. The projection system according to claim 1, wherein the image light is visible light, and the pattern light is invisible light.

4. The projection system according to claim 3, wherein the invisible light is infrared light.

5. The projection system according to claim 1, wherein the image light has a first wavelength at which ultraviolet curable resin is cured, and the pattern light has a second wavelength that is different from the first wavelength.

6. The projection system according to claim 1, wherein at least one of an installation position, an image capture direction, and zoom magnification of the at least one image capture apparatus dynamically changes.

7. The projection system according to claim 1, wherein the at least one image capture apparatus includes first and second image capture apparatuses, and
    wherein the first and second image capture apparatuses are arranged at both sides of the projection apparatus.

8. The projection system according to claim 1, wherein the at least one image capture apparatus includes first and second image capture apparatuses, and
    wherein the first image capture apparatus is arranged at a closer position to the object than the second image capture apparatus is.

9. The projection system according to claim 1, wherein the arithmetic apparatus obtains, from the image capture apparatus, first color information regarding a projection pixel identified by the image capture coordinates and determines second color information regarding the projection pixel corresponding to the first color information using the projection coordinates.

10. A semiconductor integrated circuit used in a projection system including a projection apparatus that projects image light indicating image content and pattern light including a pattern image corresponding to information in which projection coordinates in a projection coordinate system are coded, at least one image capture apparatus that generates a captured image in an image capture coordinate system, and an arithmetic apparatus, the semiconductor integrated circuit comprising:
    a pattern decoder that decodes the captured image into projection coordinate information indicating the projection coordinates corresponding to image capture coordinates in the image capture coordinate system;

a coordinate converter that converts the projection coordinate information into information regarding a distance to the object in the projection coordinate system; and a content generator that determines contents of the image in accordance with the distance information, wherein the captured image is generated by capturing reflection pattern light based on the pattern light projected onto an object from the projection apparatus, wherein the arithmetic apparatus decodes the captured image into projection coordinate information indicating the projection coordinates corresponding to image capture coordinates in the image capture coordinate system, converts the projection coordinate information into information regarding a distance to the object in the projection coordinate system, and determines contents of the image in accordance with the distance information, wherein the pattern light includes first pattern light projected in a first period and second pattern light projected in a second period, wherein the image light includes first image light projected in a third period and second image light projected in a fourth period, wherein the third period is continuous with the first period, the second period is continuous with the third period, and the fourth period is continuous with the second period, wherein the distance information includes first distance information determined on the basis of the first pattern light, wherein the contents of the image include first image content determined on the basis of the first distance information over the third period and the second period, and wherein the second image light indicates the first image content.

11. A projection system according to claim 1, wherein the pattern light is not projected in the third period and in the fourth period and the image light is not projected in the first period and in the second period, and wherein the third period is provided between the first period and the second period, and the second period is provided between the third period and the fourth period.

12. The semiconductor integrated circuit according to claim 10, wherein the pattern light is not projected in the third period and in the fourth period and the image light is not projected in the first period and in the second period, and wherein the third period is provided between the first period and the second period, and the second period is provided between the third period and the fourth period.

13. The semiconductor integrated circuit according to claim 10, wherein the image light is visible light, and the pattern light is invisible light.

14. The semiconductor integrated circuit according to claim 13, wherein the invisible light is infrared light.

15. The semiconductor integrated circuit according to claim 10, wherein the image light has a first wavelength at which ultraviolet curable resin is cured, and the pattern light has a second wavelength that is different from the first wavelength.

16. The semiconductor integrated circuit according to claim 10, wherein the arithmetic apparatus obtains, from the image capture apparatus, first color information regarding a projection pixel identified by the image capture coordinates and determines second color information regarding the projection pixel corresponding to the first color information using the projection coordinates.

17. The projection system according to claim 1, wherein projection of the pattern light in the first period is spaced from the projection of the pattern light in the second period.

18. The projection system according to claim 1, wherein projection of the image light in the third period is spaced from the projection of the image light in the fourth period.

19. The projection system according to claim 1, wherein the projection apparatus projects the first pattern light, the second pattern light, the first image light and the second image light onto the object.

20. The semiconductor integrated circuit according to claim 10, wherein the first pattern light, the second pattern light, the first image light, and the second image light are projected onto the object.

* * * * *